United States Patent [19]

Raab et al.

[11] 4,121,908

[45] Oct. 24, 1978

[54] APPARATUS FOR THE COOLING OF A CRACKING-GAS STREAM

[75] Inventors: Markus Raab, Munich; Peter Langebach, Pullach; Heiner Dittmann, Munich, all of Germany

[73] Assignee: Linde Aktiengesellschaft, Wiesbaden, Germany

[21] Appl. No.: 790,079

[22] Filed: Apr. 22, 1977

[30] Foreign Application Priority Data

Apr. 23, 1976 [DE] Fed. Rep. of Germany ....... 2617772

[51] Int. Cl.2 ........................ B01J 10/00; C10G 9/00

[52] U.S. Cl. .................................. 422/207; 196/140; 208/48 Q; 422/242

[58] Field of Search ................ 23/284, 277 R, 288 K, 23/288 R; 196/140; 208/48 Q; 261/118 R, DIG. 54; 48/102, 95, 107, 215, 214

[56] References Cited

U.S. PATENT DOCUMENTS

| | | | |
|---|---|---|---|
| 3,057,708 | 10/1962 | Hilgers | 48/215 X |
| 3,116,348 | 12/1963 | Walker | 261/118 X |
| 3,194,215 | 7/1965 | Barnes | 23/288 R X |
| 3,198,847 | 8/1965 | Lanning | 23/288 R X |
| 3,593,968 | 7/1971 | Geddes | 23/284 |
| 3,623,297 | 11/1971 | Barefoot | 261/118 X |
| 3,767,174 | 10/1973 | Heeney | 261/DIG. 54 |
| 3,844,721 | 10/1974 | Cariou | 23/284 X |

*Primary Examiner*—Morris O. Wolk
*Assistant Examiner*—Michael S. Marcus
*Attorney, Agent, or Firm*—Karl F. Ross

[57] ABSTRACT

An apparatus for the cooling of a cracking-gas stream comprises a vertical pipe through which the cracking-gas stream is conducted and opening into a larger pipe section which surrounds the first-mentioned pipe across an annular gap. A plurality of inlets open tangentially into this gap, upstream of the mouth of the first pipe to distribute cooling oil along the wall of the second pipe. The cooling oil film is found to be uniform and coherent and prevents contact of the cracking gas with the wall of this pipe. A further pipe opening axially into the surrounding pipe or pipe section sprays an additional quantity of cooling oil into the cracking-gas stream downstream of the mouth of the inlet pipe.

12 Claims, 4 Drawing Figures

APPARATUS FOR THE COOLING OF A CRACKING-GAS STREAM

FIELD OF THE INVENTION

The present invention relates to an apparatus for the cooling of a cracking-gas stream and, more particularly, to a system for the cooling of cracking gases through a large temperature differential without the formation of coke, carbonaceous deposits or the like upon the walls of the ducts or pipes through which the cracking gas is passed.

BACKGROUND OF THE INVENTION

In apparatus for the recovery of ethylene and other unsaturated hydrocarbons, it is common practice to introduce petroleum fractions as the raw material for a pyrolytic cracking process. In recent years efforts have been made to use fractions having a higher boiling point than naphtha for this purpose. The use of, for example, gas oil as the starting material for a pyrolytic cracking process has, however, several technological disadvantages.

With the pyrolysis of naphtha and lighter petroleum fractions, the cracking gas stream from the cracking furnace can be rapidly cooled by indirect heat exchange with production of high-pressure steam to obtain maximum heat utilization and a cool product which does not pose any significant difficulties since undesired subsequent reactions are substantially completely avoided. Further cooling can be carried out by the direct spraying into the cracking gas stream of oil generated in the cracking process.

However, when gas-oil cracking gases are to be cooled from elevated temperatures, various problems are involved. It is not possible, for example, to use indirect cooling methods since the latter are not immediately effective and at the elevated temperatures polymerization products and carbon deposits are formed.

The heat dissipation by indirect cooling is insufficient because of the short operating life of heat exchangers which rapidly become caked with carbonaceous deposits. With heavy petroleum fractions, moreover, insufficient heat transfer can be affected by such indirect process.

Hitherto the heat abstraction has been effected primarily be direct spraying of oil into the cracking gas stream. This also poses problems since, when the cooling oil droplets in the presence of the hot cracking gases contact the duct walls, carbonaceous deposits are formed. It has already been proposed (see German open application — Offenlegungsschrift No. 2062937) to avoid this problem by introducing the cooling oil into the cracking-gas duct so that it forms a film of cooling oil on the latter duct.

This conventional apparatus for the application of a cooling-oil film to the cracking-gas duct has, however, the disadvantage that the oil film is not always coherent, complete and uniform so that turbulence frequently brings the cooling oil, duct wall and hot cracking-gas stream into contact, carbonaceous deposits being thereby formed.

OBJECT OF THE INVENTION

It is the object of the invention to provide an improved apparatus for the cooling of a cracking gas stream of the aforedescribed type whereby coke or carbonaceous, deposit formation is substantially completely eliminated and deposition of carbonaceous deposits in the cracking-gas duct is precluded.

SUMMARY OF THE INVENTION

We have found, quite surprisingly, that the difficulties with the prior-art system described above and with earlier systems for the cooling of cracking-gas streams from gas oil petroleum fractions can be completely eliminated when, above the mouth of the cracking-gas duct or conduit, there is provided, outwardly of this conduit, an annular gap which serves to distribute a cooling oil film to a surrounding pipe section of larger diameter than the mouth of the duct and through which the cracking-gas stream is caused to pass.

The inlet for the cooling oil is thus disposed upstream of the outlet of the cracking gas with respect to the outer duct. According to a feature of the invention, the cracking-gas stream is passed through a duct having a mouth which is coaxially surrounded by a jacket and this jacket has its upstream end sealed to the outer wall of the first-mentioned duct. The inlets for cooling oil thus open into the annular gap and a completely uniform film can be distributed substantially the full length of the jacket or outer pipe which is traversed by the cooling gas stream.

It has been found that the carbon formation (coke formation) is a result of the simultaneous contact of three phases, namely, the cooling oil, the hot cracking gas and the solid duct wall at a three-phase interface period. When an annular gap is provided upstream of the mouth of the cracking gas duct with a radial width of 5 to 40 mm, preferably about 25 mm, and this gap is supplied with the cooling oil, the film which is formed on the wall of the outer pipe or jacket is found to have a coherency and tenacity which precludes turbulent contact of the three phases simultaneously.

In other words, because the oil film is complete (free from islands at which the gas can contact the outer pipe directly) and uniform before the hot cracking gas stream comes into contact with the oil film, the oil film retains its continuity during the entire period of contact. The simultaneous confluence of the three phases, namely, the cooling oil, hot cracking gas and solid duct wall, is precluded since the duct wall is completely coated with the cooling oil film during the entire contact period. The conditions necessary for formation and deposition of coke are excluded.

According to a particularly advantageous embodiment of the invention, the cracking-gas duct is disposed vertically so that a vertically descending cooling oil film is provided. It has been found that this ensures especially high uniformity of the film.

According to another feature of the invention, a plurality of inlets for the cooling oil is provided at the annular gap, or a plurality of such annular gaps disposed in succession along the path of the cracking-gas stream, each group of such inlets opening tangentially to the wall of the duct through which the cracking-gas stream is conveyed. The tangential orientation of the inlets and hence the tangential introduction of the cooling oil has been found to distribute the cooling oil especially rapidly over the entire periphery of the outer duct or pipe so that the coherent oil film is formed in a rapid manner.

The introduction of the cooling oil in this manner can be carried at one or more axially spaced locations, as noted, to satisfy the requirements of temperature reduction and for restabilization of the oil film or its renewal if desired.

At a distance of about two to three pipe diameters from the last such inlet for the cooling oil, the cracking gas pipe is constricted so that the cooling gas, after preliminary cooling of the cracking gas stream, is turbulently mixed with the latter and an especially intensive contact and heat exchange between the liquid and gas phases is carried out. Since the cracking gas has already been precooled by the cooling oil film, little or no carbonaceous deposits form by reason of this turbulent mixing. The transition pieces between the larger diameter mouth at the first annular gap or the constriction beyond the last annular gap is effected by frustoconical transition pieces which have angles of incidence between 18° and 25°, preferably about 22.5°. Particularly when such a transition piece is used at the constriction, it is found that optimum turbulencing is achieved.

Since the wall of the cooling duct is protected with a uniform continuous oil film it is possible, according to another feature of the invention, to introduce cooling oil parallel to the cracking-gas stream by spraying it centrally into the latter in the region of the duct protected by the oil film. Preferably the cooling oil conduit opens coaxially and centrally into this duct and is affixed to the intake pipe for the cracking-gas stream at an elbow therealong so that the conduit can be removed and replaced for maintenance and repair.

Advantageously, the conduit is provided with an insulting jacket which can be supplied with an insulating gas or can be evacuated.

At the end of the conduit opening into the oil-lined duct, a grid or the like can be provided to facilitate distributing the centrally introduced oil spray in the cracking gas stream.

When a large quantity of cracking gas must be cooled, several apparatuses of the type described can be connected in parallel for simultaneous use. Generally one or more of such units, when a multiplicity thereof are provided, can be rendered inoperative for maintenance while the others continue to be used. A valve system can be provided for this purpose. When a valve is closed, one of the units can be taken out of service while the remainder remain operative.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
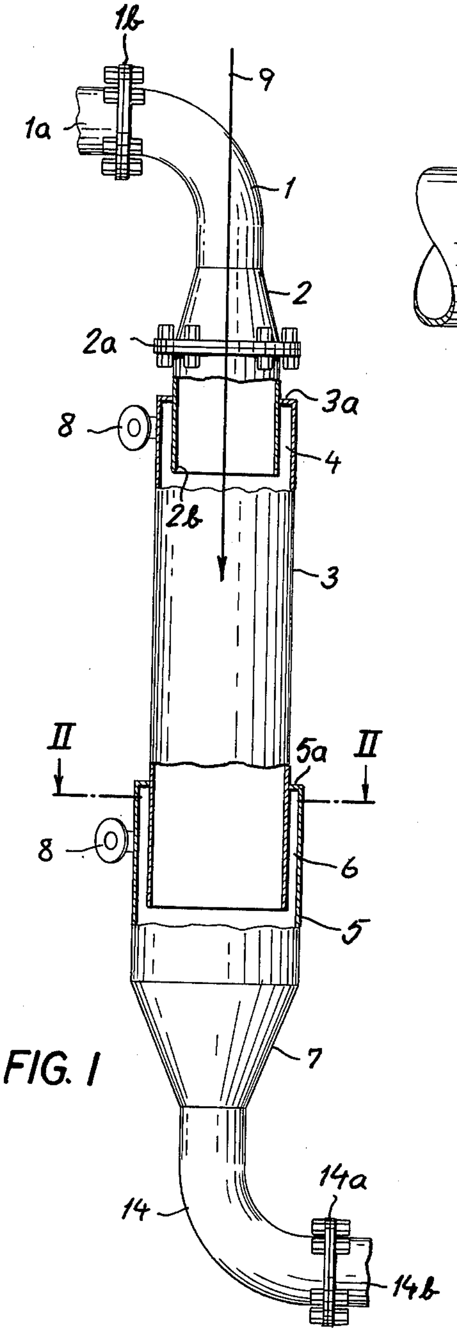
FIG. 1 is a diagrammatic vertical section through an apparatus for carrying out a cooling operation with a cracking gas stream.

In FIGS. 1 through 4 of the drawing, in which the same reference numerals designate similarly functioning parts, a cracking gas pipe 1 is formed at an elbow connected by a flange **1*b* to a horizontal supply pipe 1*a*. The pipe 1 can have a diameter of 300 mm. At its downwardly turned end, the pipe 1 is provided with a frustoconical transition piece 2 which conically widens to a diameter of 400 mm and is connected by a flange 2*a* to a cylindrical discharge pipe 2*b* of a diameter of 400 mm. The frustoconical transition piece 1** can have an angle of incidence of 18° to 25°, preferably 22.5°.

Coaxially surrounding the pipe section **2*b* is a cylindrical duct 3 which is sealed at its upstream end 3*a* against the outer wall of the pipe section 2*b*. The duct 3 has a diameter of 450 mm and defines an annular gap 4 with the pipe section 2*b*, this annular gap beginning at a point upstream of the end of the pipe section 2*b* and communicating axially with the interior of the duct 3. The radial width of this gap 4** is thus about 25 mm.

Figure 2:
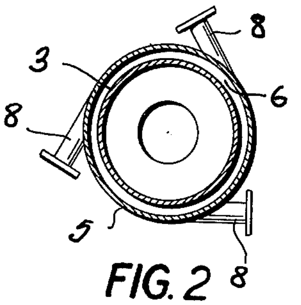
FIG. 2 is a cross section through the apparatus of FIG. 1 taken along the line II—II thereof, drawn to an enlarged scale.
Figure 4:
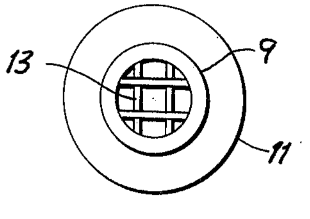
FIG. 4 is a view taken along the line IV—IV of FIG. 3, likewise drawn to an enlarged scale.

The gap 4 is provided with three inlets 8 for cooling oil, the inlets opening tangentially as has been illustrated in FIG. 2 for a lower set of inlets also designated by the reference numerals 8.

At a distance of about 1100 mm from the outlet of pipe section **2*b*, there is provided another cylindrical pipe section 5 which coaxially surrounds the duct 3 and is sealed thereto at its upstream end 5*a*. The pipe section 5 has a diameter of 500 mm and thus defines an annular gap 6 which opens axially downwardly and has a radial width of about 25 mm. Into the axially extending annular gap 5, three inlet pipes 8 open tangentially as has been shown in FIG. 2**.

At a distance of about 1100 mm from the top **5*a* of this annular gap 6, the pipe section 5 is connected to a frustoconically downwardly converging transition piece 7** whose angle of incidence is about 22.5° and narrows to a diameter of 300 mm.

As can be seen from FIG. 2, when the cooling oil is introduced through the inlets 8, each of which has a diameter of about 40 mm, the cooling oil is distributed in the clockwise sense uniformly about the interior of the pipe section 5 or the interior of the duct 3 and forms a continuous film therein. The continuous films are not disturbed by the cracking gas steams supplied through the pipe section **2*b* for the duct 3**, respectively.

Figure 3:
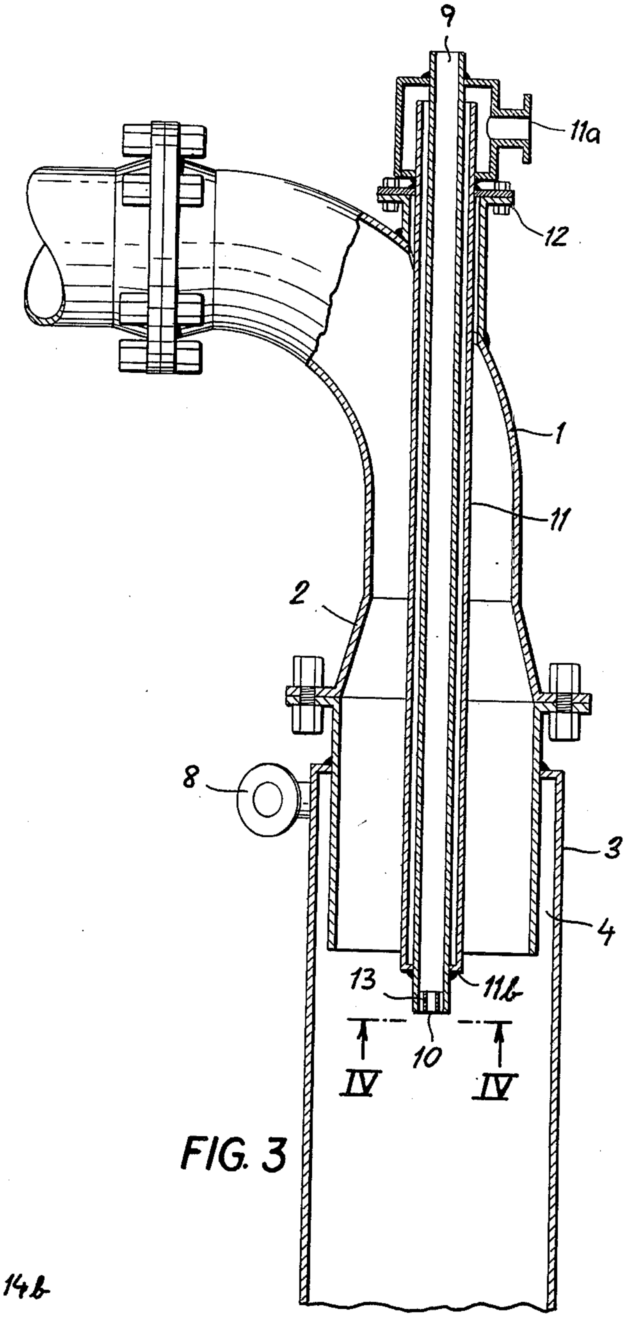
FIG. 3 is detail view of the upper portion of the apparatus of FIG. 1.

As can be seen from FIG. 3, a feed conduit 9 opens coaxially into the duct 3 just downstream of the mouth of the pipe section **2*b* and is surrounded by a jacket 11 which is sealed to the conduit 11 at its lower end 11*b*. At its upper end, the jacket 11 is provided with an inlet 11*a* through which an insulating gas can be introduced into the space between the jacket 11 and the conduit 9. Alternatively, this space can be evacuated through the fitting 11*a*. The unit consisting of the jacket 11 and the conduit 9 can be mounted by a flange connection 12 to the pipe 1** at the elbow thereof so that when the screws of the flange connection are removed, the unit can be withdrawn for inspection, cleaning or replacement.

At its lower end 10, the conduit 9 is provided with a grid 13 which facilitates distributing the cooling oil as a spray into the cracking gas stream flowing downwardly from the pipe section **2*b* into the duct 3 and then outwardly from the transition piece 7 through another elbow 14 which is flanged at 14*a* to a discharge pipe 14*b*. The metal body 13 acts as an impingement baffle to distribute the cooling oil into the gas duct 3**.

SPECIFIC EXAMPLE

The Example is carried out using an apparatus as shown in FIGS. 1 through 4 with dimensions as set forth previously.

The cracking gas at a mass flow rate of 30 $kg/m^2$ sec. flows from a pyrolysis furnace with a velocity of 55 meters/cecond and at a pressure of 1.6 bars at a temperature of 850° K into the cooling apparatus (pipe 1). Via the feed pipes 8, 10 to 20 kg/second of cooling oil is introduced into the annular gap 4. The same quantity is supplied to the annular gap 6, uniformly distributed among the pipes 8. An oil film having a thickness of about 5 mm is formed continuously on the internal walls of the pipes 3 and 5 ahead of the inlets for the cracking gas stream thereto.

Via conduit 9 an additional quantity of 25 to 30 kg/second of cooling oil is sprayed into the cracking gas stream. The cooling oil is a hydrocarbon mixture having an average molecular weight of 290. The cracking gas, as measured at the elbow 14, is cooled to a temperature of about 500° K.

We claim:

1. An apparatus for the cooling of a cracking-gas stream which comprises:

- a vertically disposed pipe having an axially open outlet;
- a vertically disposed duct connected to and coaxially surrounding said pipe in the region of said outlet and extending axially downstream therefrom, said duct defining an annular gap upstream of said outlet;
- feed means opening into said annular gap for admitting cooling oil to same;
- means for passing a cracking-gas stream axially through said pipe and said duct;
- a cylindrical pipe section connected to and coaxially surrounding a lower portion of said duct and defining a further annular gap therewith; and
- a transition piece connected to said pipe section, the last-mentioned annular gap being provided with a plurality of oil inlets opening tangentially into same.

2. The apparatus defined in claim 1 wherein each of said annular gaps has a radial width of 5 to 40 mm.

3. The apparatus defined in claim 1 wherein said feed means includes a plurality of feed pipes connected to said duct and opening into the first-mentioned gap.

4. The apparatus defined in claim 1, further comprising a conduit opening axially centrally into said duct adjacent said mouth of said pipe for spraying cooling oil into the cracking-gas stream flowing into said duct.

5. The apparatus defined in claim 4, further comprising a thermally insulating jacket coaxially surrounding said conduit.

6. The apparatus defined in claim 5 wherein said jacket and said conduit form a unit, said apparatus further comprising means for releasably mounting said unit on said pipe.

7. The apparatus defined in claim 6 wherein said pipe is formed with an elbow above said duct, said unit extending axially through a vertical portion of said elbow and projecting outwardly from said elbow.

8. An apparatus for the cooling of a cracking-gas stream which comprises:

- a vertically disposed pipe having an axially open outlet;
- a vertically disposed duct connected to and coaxially surrounding said pipe in the region of said outlet and extending axially downstream therefrom, said duct defining an annular gap upstream of said outlet;
- means for passing a cracking-gas stream axially through said pipe and said duct;
- means for introducing a cooling oil into said gap upstream of said outlet whereby said cooling oil forms a film along the wall of said duct downstream from said outlet preventing direct contact of said cracking gas with said wall of said duct, said means for introducing cooling oil into said gap including a plurality of feed pipes connected to said duct and opening tangentially into said gap for supplying said cooling oil thereto;
- a cylindrical pipe section connected to and coaxially surrounding a lower portion of said duct and defining a further annular gap therewith; and
- a frustroconically converging transition piece downstream of said pipe section and connected thereto for inducing turbulence in a cooling oil/cracking gas mixture traversing same, said transition piece having an angle of incidence between 18° and 25°, the last-mentioned annular gap being provided with a plurality of oil inlets opening tangentially into same.

9. The apparatus defined in claim 8, further comprising a conduit opening axially centrally into said duct adjacent the inlet end of said pipe for spraying cooling oil into the cracking-gas stream flowing into said duct.

10. The apparatus defined in claim 9, further comprising a thermally insulating jacket coaxially surrounding said conduit.

11. The apparatus defined in claim 10 wherein said jacket and said conduit form a unit, said apparatus further comprising means for releasably mounting said unit on said pipe.

12. The apparatus defined in claim 11 wherein said pipe is formed with an elbow above said duct, said unit extending axially through a vertical portion of said elbow and projecting outwardly from said elbow.

* * * * *